(12) United States Patent
Kawamoto et al.

(10) Patent No.: US 6,640,286 B2
(45) Date of Patent: Oct. 28, 2003

(54) CACHE CONTROL SYSTEM

(75) Inventors: Shinichi Kawamoto, Hachioji (JP);
Tatsuo Higuchi, Fuchu (JP); Naoki Hamanaka, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 379 days.

(21) Appl. No.: 09/810,549

(22) Filed: Mar. 19, 2001

(65) Prior Publication Data

US 2002/0053006 A1 May 2, 2002

(30) Foreign Application Priority Data

Nov. 2, 2000 (JP) ........................................ 2000-340379

(51) Int. Cl.[7] .............................................. G06F 12/08
(52) U.S. Cl. ........................ 711/133; 711/128; 711/136
(58) Field of Search ................................. 711/118, 128, 711/129, 133, 134, 136

(56) References Cited

U.S. PATENT DOCUMENTS

| | | |
|---|---|---|
| 5,546,559 A | 8/1996 | Kyushima et al. |
| 5,787,490 A | 7/1998 | Ozawa |
| 6,425,058 B1 * | 7/2002 | Arimilli et al. .............. 711/134 |
| 6,434,669 B1 * | 8/2002 | Arimilli et al. .............. 711/128 |
| 6,510,493 B1 * | 1/2003 | Liu et al. ..................... 711/133 |

FOREIGN PATENT DOCUMENTS

JP  728706  1/1995

OTHER PUBLICATIONS

IA–64 Application Developer's Architecture Guide, Rev. 1.0, 1999(Intel).

* cited by examiner

*Primary Examiner*—Hiep T. Nguyen
(74) *Attorney, Agent, or Firm*—Antonelli, Terry, Stout & Kraus, LLP

(57) ABSTRACT

A cache memory unit that preferentially stores specific lines at the cache memory, according to the program nature, dynamically changes the priority ranks of lines, and increases the cache memory hit rate. For this purpose, the lines to be accessed by a processor are divided into groups and definitions of the groups are set in a group definition table; a policy by which to store lines belonging to the groups into the cache memory is set in a policy table; and storing lines into the cache memory is executed, according to the group definitions and the policy of storing set in the tables.

13 Claims, 6 Drawing Sheets

| Po | Si | P1 | P2 | G |
|---|---|---|---|---|
| 24 | 16 | 0x0000 | 0x1200 | G1 |
| 24 | 16 | 0x1201 | 0xBE00 | G2 |
|  |  |  |  |  |
|  |  |  |  |  |

| G1 | G2 | G3 | G4 |
|---|---|---|---|
| G1 |  |  |  |
| G1 |  |  |  |
| G1 | G2 |  |  |
| G1 | G2 |  |  |

FIG.6

| Po | Si | P1 | P2 | G |
|----|----|----|----|----|
| 4 | 2 | 01 | 01 | G1 |
| 4 | 2 | 10 | 10 | G2 |
|   |   |   |   |   |
|   |   |   |   |   |

FIG.7

| G1 | G2 | G3 | G4 |
|----|----|----|----|
| IG |    |    |    |
| IG |    |    |    |
| IG |    |    |    |
| DG |    |    |    |

FIG.9

800 PARTITION DEFINITION TABLE

|  | N1 | N2 | N3 | N4 |
|---|---|---|---|---|
| P1 | 1 | 1 | 0 | 0 |
| P2 | 0 | 0 | 1 | 0 |
| P3 | 0 | 0 | 0 | 1 |
| P4 | 0 | 0 | 0 | 0 |

CACHE CONTROL SYSTEM

BACKGROUND OF THE INVENTION

The present invention relates to a cache memory unit, placed between processors and a main memory, for short-time storage to retain part of the contents of the main memory; and, more particularly, the invention relates to the cache memory unit that is so designed that specific lines are preferentially stored into the cache.

A cache is a faster-access memory of small capacity placed between a main memory and a processor that executes instructions read from the main memory. The cache is designed to temporarily retain the data in given units that the processor has fetched or retrieved through access to the main memory. Units of data to be stored into the cache are called blocks or cache lines. In the present Specification, the above units are simply referred to as lines.

The processor first accesses the cache to retrieve a line it needs. If the line exists on the cache (this result is called a hit), the processor uses it; otherwise, the processor accesses the main memory. The higher the cache hit rate, the more efficient will be the processing that can be performed. To increase the cache hit rate, it is necessary that lines more frequently accessed remain stored on the cache.

An analysis of patterns in which programs access the memory shows a general tendency: a spatial locality in that addresses near an accessed address are likely to be accessed before long; and a temporal locality in that the accessed address is likely to be accessed again before long. A typical known cache is designed to operate efficiently for programs having the above tendency. For such a cache, data access is performed in line units and data around the required data is stored together with the required data into the cache. Furthermore, in a cache using the LRU (Least Recently Used) method, a line that has been least recently accessed is replaced by a new line, so that recently accessed lines are not readily replaced.

However, the locality differs for different programs or different parts of a program. Data access in line units and line replacement by the LRU method do not always lead to an increase of the cache hit rate. This tendency is noticeable especially for business application programs.

One cause of the above problem is the storing of all lines equally into the cache. With the aim of solving this problem, some approaches have been disclosed that address this problem by preferential storing of specific lines into the cache, which contributes to enhancement of the cache performance. These approaches will be mentioned below.

In an approach described in U.S. Pat. No. 5,546,449 (this approach is hereinafter referred to as example 1), a specified line is inhibited from being replaced by another line.

In an approach described in Japanese Patent Laid-Open Publication No. 07-028706 (this approach is hereinafter referred to as example 2), priority ranks are assigned to lines when the lines are stored into the cache and a line of higher priority rank is inhibited from being replaced by a line of lower priority rank.

In an approach described in IA-64 Application Developer's Architecture Guide, Intel, May (1999) pp. 4–20 to pp. 4–23 (this approach is hereinafter referred to as example 3), hint information is included in an instruction issued from a processor and a cache operation is controlled to store the line accessed by the instruction into a location of a certain level in the cache hierarchy, based on this information.

In an approach described in U.S. Pat. No. 5,787,490 (this approach is hereinafter referred to as example 4), every process is given a priority rank in the right to use the cache and the cache operation is controlled, based on this process-specific priority.

The above examples 1, 2, and 3 are, so to speak, methods in which different cache priority ranks are assigned to different lines. However, dynamic change in the way priority ranking is given to the lines is not taken into consideration.

On the other hand, as for the above example 4, it can be said that the priority is changed dynamically. However, the priority that can be changed in this example depends on the process for which a line is used.

Even in the same application, it is conceivable that the priority to be given to an individual line dynamically changes, depending on the load and use condition. Unless the cache executes line replacement control adaptive to the dynamic change of priority on a line-by-line basis, at present, there is a possibility of occurrence of undesirable line replacement, i.e., a line which is to preferentially remain stored on the cache is replaced by a lower priority line, which results in a condition in which the total cache hit rate cannot be increased sufficiently.

SUMMARY OF THE INVENTION

Accordingly, an object of the present invention is to provide a cache that enables a dynamic priority change on a per line basis so that the cache will preferentially retain higher priority lines and the cache hit rate will be increased, thereby providing for more efficient memory access.

Another object of the invention is to provide a cache memory unit applicable to an information processing system in which computer resources can be divided into a plurality of partitions and different applications can be run in different partitions, the cache enabling the user to specify lines to be handled preferentially and using an optimum method (policy) to store grouped lines into the cache per partition.

Another object of the invention is to provide a cache memory unit that achieves a higher cache hit rate than a typically known cache that handles lines equally, and which can be configured simply by modifying the system.

In the cache memory system configured according to a typical embodiment of the invention, a grouping method for dividing lines into groups is set into a table. Also, a storing policy for storing lines into the cache memory is defined for each of the groups set into the table. When an access command issued from a processor to access the main memory turns out to be a miss on the cache memory, the objective line is read from the main memory, and a line attribute of the objective line to which group the objective line belongs, in other words, is determined according to the table. Then, the objective line is stored into the cache memory according to control information of the cache memory and a storing policy of the corresponding group.

A detailed example of the configuration of the above-described cache memory system is as follows. The cache memory unit comprises a cache memory comprising a plurality of entries, each of which consists of a data area where a line is to be stored and a control information area where control information for the line is to be stored; a group definition controller that is used to divide lines that may be read by the processor from the main memory into groups and specify definitions of the groups; a group selector to determine one of the groups to which the line belongs in accordance with the group definitions and the information in a command issued from the processor to read data from the main storage; a policy definition controller that is used to assign a policy of storing whereby lines belonging the groups are stored into the cache memory; and a storing means to read a line from the main memory and store the line into the cache memory in accordance with the group to which the line belongs, the line control information retained in the cache memory for the candidate lines to be replaced, and the policy of storing, if a read request from the processor results in a miss.

In the foregoing examples, 1, 2, and 3, when a line is stored into the cache, if it is stored in accordance with the priority rank assigned to it at this point, this storing approach appears to be adaptive to a dynamic priority change. In the case of the examples 1 and 2, however, the priority rank of a line is recorded as control information into the cache memory when the line is stored into the cache. If, for example, a line L1 has priority P1 when it is stored into the cache, the priority P1 information is recorded into the cache memory together with the line L1 as the line L1 is stored. Even if the priority P1 of the line L1 is updated to a lower priority P1' later, the cache memory retains the priority P1 information for the line L1 as is. Suppose that a new line L2 having priority L2 and the same index as the line L1 is stored into the cache and the priority ranking is P1'<P2<P1. At the point of storing the line L2, the priority P2 of the line L2 is higher than the priority P1' of the line L1, and thus the line L1 should be replaced by the line L2. However, in actual practice, the line L2 is not stored into the cache, because a comparison is made between the old priority information P1 for the line L1, recorded in the cache, and the priority P2 of the line L2, and the priority of the line L1 is judged to be higher than that of the line L2.

In the case of the example 3, three levels of cache hierarchy are set: level 1 cache, level 2 cache, and level 3 cache. Four priority ranks are set: a line having a priority P1 is stored into the caches of all levels 1 to 3 of cache hierarchy; a line having a priority P2 is stored into the level 2 and level 3 caches only; a line having a priority P3 is stored into the level 3 cache only; and a line having a priority P4 is not stored into any level cache. The priority is used only when a line is stored into the cache. Suppose that the priority of a line L1 is P2 so that the line is stored in both level 2 and level 3 caches at a certain point in time. If the priority of the line L1 is updated to P3 later, the line L1 should be stored into the level 3 cache only. However, the previously stored line L1 remains stored in the level 2 cache, which affects the cache hit rate for other lines that are assigned priority P2 and are to be stored into the level 2 cache.

In another mode of embodying the invention, in addition to that described above, the line and group attribute definitions are separately assigned on a partition-by-partition basis and the cache memory units in each partition operate, based on the same definitions. Similarly, the policy of storing is separately assigned on a partition-by-partition basis and the cache memory units in each partition operate, based on the same policy.

Each time a change is made to the structure of the partitions of a computer system, the partition manager that is responsible for the management of the structure of the partitions will assign group definitions to the group definition tables for all cache memory units included in the partitions by means of the group definition controller. Similarly, the partition manager will assign a policy of storing to the policy tables for all cache memory units included in the partitions by means of the policy definition controller.

Furthermore, in another mode of embodying the invention, in addition to that described above, the group definition table contains data group and instruction group definitions; a line accessed as a result of the fact that the processor issues an instruction access command belongs to the instruction group and a line accessed as a result of the fact that the processor issues a data access command belongs to the data group. The group selector determines that the group to which a line belongs is the instruction group when the line is accessed due to the fact that the processor issues an instruction access command. The group selector determines that the group to which a line belongs is the data group when the line is accessed due to the fact that the processor issues a data access command.

Features of the present invention other than those described above will be disclosed in the following detailed description of the preferred embodiments.

BRIEF DESCRIPTION OF THE DRAWINGS

A preferred form of the present invention is illustrated in the accompanying drawings in which:

FIG. 6 is a group definition table containing an example of values to be used in Embodiment 3;

FIG. 7 is a policy table containing an example of values to be used in a preferred Embodiment 4 of the present invention;

FIG. 9 is a partition definition table which is used in Embodiment 5.

DETAILED DESCRIPTION OF THE PREFERRED EMBODIMENTS

Embodiment 1

Figure 1:
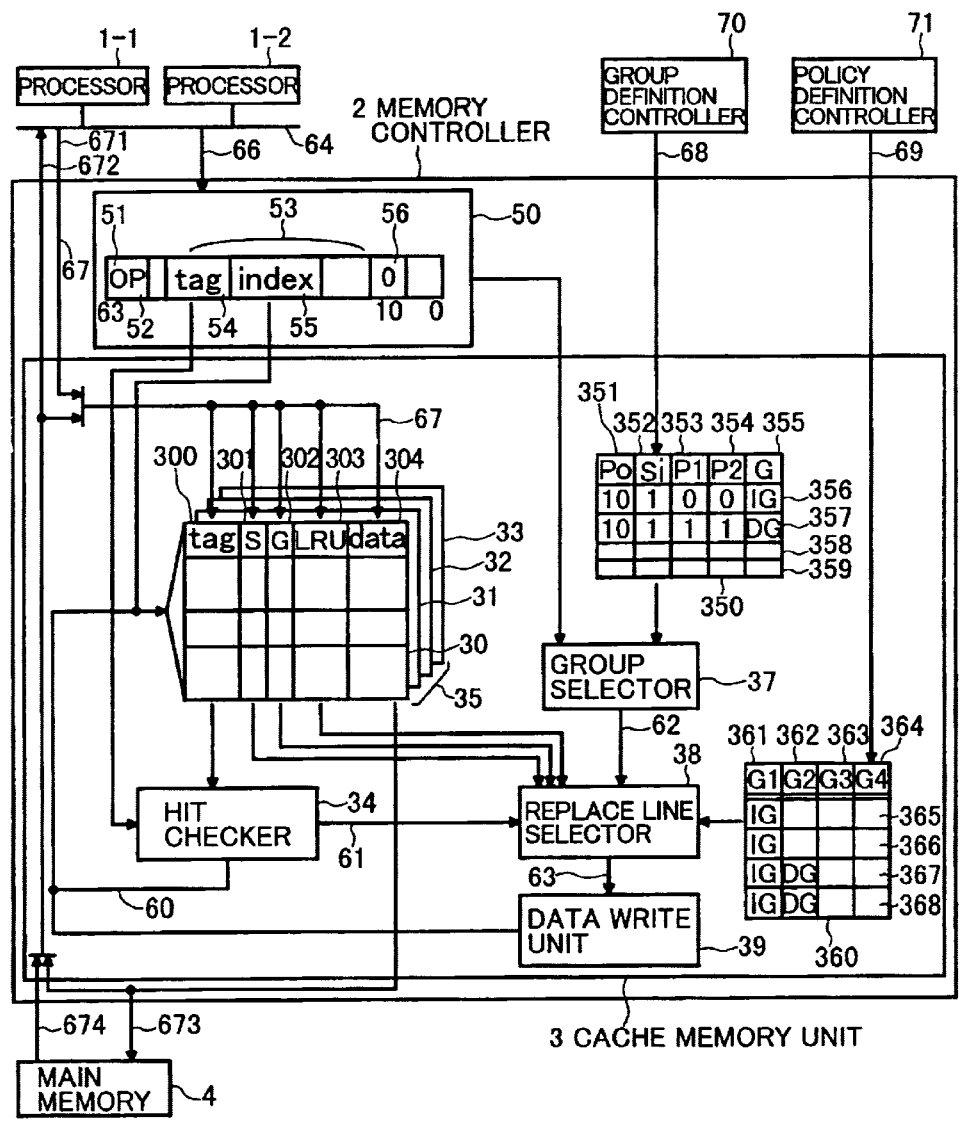
FIG. 1 is a block diagram of a preferred Embodiment 1 of the present invention, consisting of one node.

FIG. 1 shows the configuration of an information processing device including a cache memory unit according to an embodiment of the present invention. Two processors 1-1 and 1-2 arranged along a processor bus 64 are connected to a memory controller 2 by an address path 66 and data paths 671 and 672. The memory controller 2 is connected to a main memory 4 along data paths 674 and 673. The processors 1 read instructions from the main memory through the memory controller 2 and operate in accordance with the instructions. The processors 1 send a command 51 to the memory controller 2 as required to request the memory controller 2 to read data from the main memory or write data into the main memory.

A cache memory unit 3 of the present invention is installed in the memory controller 2. According to a command 51 issued from one of the processors 1, the memory controller 2 accesses the main storage 4. The memory controller 2 stores the data retrieved by the access to the main memory 4 into the cache memory unit 3. When one of the processors 1 issues a request for the access to that data again, if that data still remains stored in the cache memory unit 3, the processor 1 uses the data stored in the cache memory unit 3 instead of the data stored in the main memory 4.

The command 51 that the memory controller 2 receives from one of the processors 1 includes an operation code (op) 52, an address 53 part, and an instruction/data discrimination bit 56 to discriminate between instruction and data to be accessed. The address 53 part consists of tag 54, index 55, and offset fields. The command 51 is 64 bits long and its tenth bit is the instruction/data discrimination bit 56. The memory controller 2 has a command register 50 into which the command 51 issued from the processors is stored. When the processor issues the command 51 to the memory controller 2, the memory controller 2 stores the command into the command register 50.

The cache memory unit of Embodiment 1 will be explained below.

Description of a Cache Memory 35

Arranged on a 4-way set-associative scheme, a cache memory 35 comprises four cache memory banks: cache memory bank 0 (30), cache memory bank 1 (31), cache memory bank 2 (32), and cache memory bank 3 (33). Each cache memory bank comprises, for example, 16k entries, in each of which information for one line is stored. Each entry consists of a control information area and a data area. The control information area comprises the fields of tag 300 that is a partial bit string of the address part, status (S) 301, group identifier (G) 302, and LRU (Least Recently Used) 303 that indicates how long the line data remains unused since the last time it was accessed. The data area comprises data area 304. The status 301 field contains one of the four statuses: "Modified" indicating that the line data has been modified; "Exclusive" indicating that only one processor is referring to the line; "Shared" indicating that a plurality of processors are referring to the line; and "Invalid" indicating that the line is invalid.

Description of a Group Definition Controller 70

A group definition controller 70 is provided for registering group definition D (attribute information) that defines a group to which the line belongs and the attribute of the group into a group definition table 350, e.g., the group definition controller is the console of the information processing device. Alternatively, the group definition controller may be embodied as a memory mapped I/O device with a circuit for extracting data by decoding the information stored at an address. In short, the group definition controller may be embodied by using a publicly known technique. The group definition controller may operate as the definition means to set line and group attribute definitions which are used for the management of cache memory operation in the group definition table which will be described below.

Description of the Group Definition Table 350

One line of the group definition table 350 gives the definition D of a group of a particular attribute. The group definition table 350 contains four lines (356, 357, 368, and 359) in which up to four groups can be defined. Each line of a group definition comprises the fields of position Po (351), size Si (352), pattern PI (353), pattern P2 (354) and group identifier G (355). The position 351 value indicates the least significant bit of the bit string that contains group-identifying information within the bit string of the command 51. The size 352 value indicates the bit length of the group-identifying information. The values of the patterns P1 and P2 indicate a pattern that is used to check for a match between the bit string specified by the position 351 and size 352 within the command 51 and this pattern or a pattern range that is used to check whether the above bit string falls within this range. If the pattern P1 value equals the pattern P2 value, the value indicates a pattern for matching check. If the pattern P1 value differs from the pattern P2 value, these values indicate the pattern range. The group identifier 355 value indicates the identifier of a group to which the line to be accessed by that command 51 belongs if the value of the bit string specified by the position 351 and size 352 matches the pattern P1 or falls within the range defined by the pattern P1 and the pattern P2.

As for the group definition table 350 illustrated in the present embodiment (FIG. 1), group definitions are registered on its first line 356 and second line 357, i.e., two groups are defined. The position 351 values of group definition on the first line 356 and group definition on the second line 357 are the 10th bit and the size value is one bit, which indicates that one bit, the 10th bit of the command 51, contains group information. As illustrated in FIG. 1, the 10th bit of the command 51 is the instruction/data discrimination bit 56. Thus, the two groups are distinguished, depending on whether the line is instruction or data. On the first line 356 of the group definition table 350, both the pattern P1 and pattern P2 values are 0 and the group identifier 355 is IG (Instruction Group). This means that a group to which the line to be accessed by the command 51 is an instruction group if the instruction/data discrimination bit 56 of the command 51 is 0.0 on the second line 357 of the group definition table 350, both the pattern P1 and pattern P2 values are 1 and the group identifier 355 is DG (Data Group). This means that a group to which the line to be accessed by the command 51 is a data group if the instruction/data discrimination bit 56 of the command 51 is 1.

Description of a Group Selector 37

A group selector 37 checks a command 51 issued from one of the processors 1 against the group definition table 350 and determines what is the group identifier to which the line to be accessed by the command 5 belongs. The group selector 37 determines the group identifier by following the procedure below:

(1) The group selector first reads one group definition from the group definition table 350.
(2) The group selector reads the bit string specified by the position 351 and size 352 in the read group definition D from the command 51.
(3) The group selector judges whether the retrieved bit string matches the pattern P1 in the group definition D, or whether the value of the bit string falls within the range defined by the pattern P1 and pattern P2.
(4) If the match-up or the range is true in the above step (3), the group selector determines that the group identified by the identifier 355 in the group definition D is the group to which the line belongs.
(5) If the match-up or the range is not true in the above step (3), the group selector refers to another group definition D and repeats the above steps (1) to (4).

In the case of the present example (FIG. 1), the 10th bit of command 51 contains a value of 0. This matches the value of 0 of the pattern 353 in the group definition on the first line 356 of the group definition table 350. Therefore, it is determined that the group to which the line to be accessed by the command 51 belongs is an instruction group.

Description of a Policy Definition Controller 71

A policy definition controller 71 is provided for registering a policy of storing that specifies how to store lines into the cache memory in accordance with the line and group attributes in a policy table 360, e.g., the policy definition controller is the console of the information processing device. Alternatively, the policy definition controller may be embodied as a memory mapped I/O device with a circuit for extracting data by decoding the information stored at an address. In short, the policy definition controller may be embodied by using a publicly known technique.

Description of the Policy Table 360

A policy table 360 defines the policy storing rules. A set of groups is defined on each line of the policy table 360. Each line of the policy table 360 comprises the fields of group G1 (361), group G2 (362), group G3 (363), and group G4 (364), each of which contains one group identifier. A set of groups is defined as a set comprising members of groups identified by group identifiers contained in the group G1 (361) to G4 (364) fields (some fields may be empty). Since up to four groups can be defined in the group definition table 350, four group fields are provided in the policy table 360.

The policy table contains four lines 365, 366, 367, and 368 and four sets of groups in total are defined in the table . The number of group sets is four because the present cache memory unit 3 is a 4-way set-associative cache comprising four cache memory banks 30, 31, 32, and 33.

On the first line 365 and second line 366 of the policy table 360, a group set (IG) is set that comprises only one member of instruction group IG. On the third line 367 and fourth line 368, a group set {IG DGI} is set that comprises instruction group IG and data group DG members. The policy table 360 as a whole defines the following policy of storing:

({FIG}, {IG}, {IG DG}, {IG DG})  ①

This policy of storing means that any two of the four cache memory banks 30, 31, 32, and 33 are used exclusively for lines that belong to an instruction group IG and the remaining two banks are used for lines that belong to an instruction group or a data group DG. In other words, a maximum of four lines belonging to an instruction group IG and a maximum of two lines belonging to a data group DG can be stored into the same-index entries on the banks (as a set) of the cache memory. Therefore, the same-index entries may be allocated for lines in any of the following patterns of combinations of groups to which the lines belong (which hereinafter are referred to as storing patterns):

(IG, IG, IG, IG) (All lines belong to IG.) (Pattern 1)

(IG, IG, IG, DG) (Three lines belong to IG and one line belongs to DG.) (Pattern 2)

(IG, IG, DG, DG) (Two lines belong to ID and two lines belong to DG.) (Pattern 3)

The policy of storing in the present example defines the number of lines that belong to a group to be retained in the same-index entries on the banks of the cache and what groups are to share the corresponding entry locations (of the same index) of the cache memory banks as storing rules. The lines may be stored into any cache memory bank, provided the above number of lines is correct.

Figure 2:
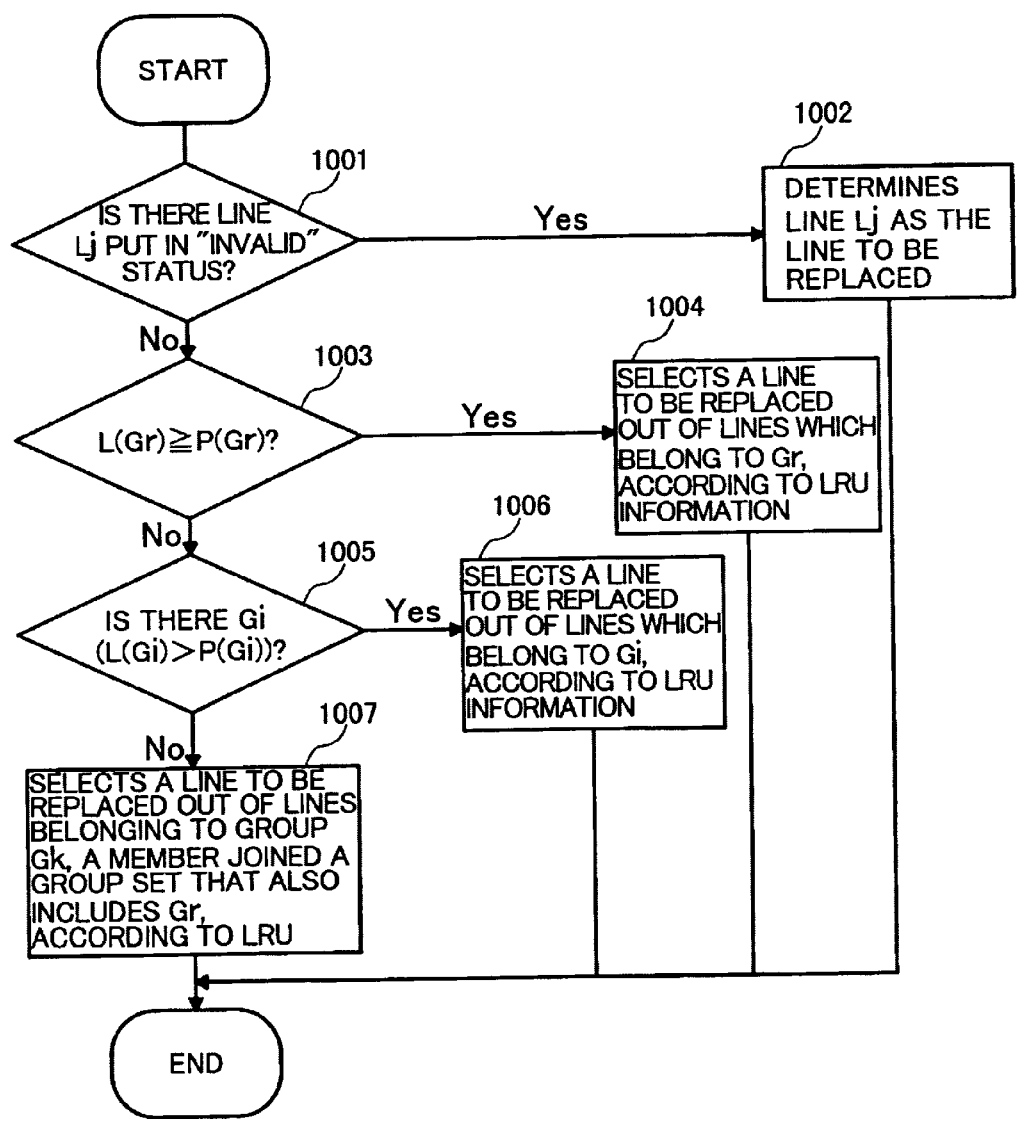
FIG. 2 is a flowchart illustrating the algorithm of operation of the replace line selector in Embodiment 1.

If lines are stored into the cache in accordance with this policy of storing, the lines that belong to an instruction group IG will stay on the cache longer and will be more preferentially handled than the lines that belong to a data group. By specifying a desirable policy of storing, the user can give higher priority to a certain group of lines. How to store lines into the cache, according to the policy of storing, will be described later with reference to FIG. 2.

Description of a Hit Checker 34

A hit checker 34 judges whether a line is stored in the cache memory 35 and sets the hit information 60 bit to 1 if the line is stored (this state is called a hit) and sets the miss information 61 bit to 1 if the line is not stored (this state is called a miss). The hit checker 34 corresponds to the hit decision circuit in a typical known cache and may be embodied by using a publicly known technique.

Description of a Replace Line Selector 38

A line read from the main memory 4 is able to replace any line previously stored in the cache memory 35. A replace line selector 38 selects a line to be replaced by a new line. Details of the replace line selector 38 will be described later in the description of operation.

Description of a Data Write Unit 39

When a line 63 to be replaced by a new line has been selected by the replace line selector 38, if the status of the line 63 to be replaced is Modified, a data write unit 39 writes the line back into the main memory 4 and stores the new line into the cache memory bank where the line 63 to be replaced has been stored. The data write unit 39 corresponds to the data write circuit in a typical known cache and may be embodied by using a publicly known technique.

The components of the cache memory unit 3, as explained above can be implemented as follows. The group definition controller 70, the policy definition controller '71, the hit checker 34, and the data write unit 39 can be embodied by using a publicly known technique. The cache memory 35 can also embodied by using a publicly known technique, except for the group identifier 392 that is added to the information for each entry. New components are the group definition table 350, the group selector 37, the policy table 360, and the replace line selector 38.

Next, the operation of the information processing device including the cache memory unit 3, shown in FIG. 1, will be explained.

Initialization

At the startup of this information processing device, group definitions are registered into the group definition table 350 by the group definition controller 70 and a policy of storing is registered into the policy table 360 by the policy definition controller 71. Then, software starts to run on the information processing device. Even after the start of the software that is run on the information processing device, the contents of the group definition table 350 and the policy table 360 may be modified at any arbitrary time.

The processors 1 execute processing in accordance with program:instructions and send the command 51 to the memory controller 2 when the access to the main memory is required. When the memory controller 2 accepts the command 51 stored into its command register 50, it executes processing in accordance with the command 51. First, the memory controller 2 refers to the cache memory banks 30, 31, 32, 33 in parallel by using the index 55 information in the command 51 as an index and reads the control information (300, 301, 302, 303) parts of the lines stored in the entries indexed by that index on the cache memory banks 30, 31, 32, 33. The hit checker 34 compares each of the tags 300 of the read control information parts of the four lines with the tag 54 in the command 51. If one of the four tags 300 matches the tag 54, the hit checker 34 sets the hit information 60 bit to 1, which indicates that the line to be accessed by the command 51 has been hit on the cache. If none of the tags 300 match the tag 54, the hit checker 34 sets the miss information 61 bit to 1, which indicates that the line to be accessed by the command 51 is missing on the cache.

When the hit checker 34 sets the hit information 60 bit to 1, the cache memory unit 3 accesses the entry indexed by the index 55 in the cache memory bank where the tag 300 that matched the tag 54 exists. If the command 51 is read, the cache memory unit 3 reads the line from the data area 304 of that entry and returns it to the processor 1 that issued the command. If the command 51 is a write command, the cache memory unit 3 writes the data and control information sent from the processor that issued the command into the data area 304 of that entry. When the hit checker 34 sets the miss information 61 bit to 1, the cache memory unit 3 accesses the main memory 4, reads a line f rom the address 53 specified in the command 51, and returns the line to the processor 1 that issued the command. At the same time, the cache memory unit 3 stores the line (which is hereinafter referred to as the line to be stored) into the cache memory. To store the line to be stored into the cache memory, first, the replace line selector 38 selects a line to be replaced out of four lines (which are hereinafter referred to as candidate lines to be replaced) stored in the entries indexed by the index 55 on the cache memory banks 30, 31, 32, and 33. The details as to how to select a line to be replaced will be described later. When the replace line selector 38 has selected a line 63 to be replaced, if the status of the line 63 to be replaced is Modified, the data write unit 39 writes the line back into the main memory and stores the line to be stored into the entry location indexed by the index 55 in the cache memory bank where the line to be replaced has been stored. At this time, the group identifier 62 (determined by the group selector) to which the line to be stored belongs is stored into the group identifier 302 field.

Modification to the contents of the group definition table 350 by the group definition controller 70 or modification to the contents of the policy table 360 by the policy definition controller 71 during the operation of the information processing device affects only the processing to be executed by the replace line selector 38, but the processing of the cache control unit 3 components other than the replace line selector 38 will remain the same as described above.

The details of the operation of the replace line selector 38 will be described below.

The replace line selector 38 selects a line to be replaced out of four candidate lines to be replaced by using the control information (status 301, group identifier 302, and LRU 303) for the four candidate lines, the group identifier 62 of the group to which the line to be stored belongs, determined by the group selector 37, and the policy table 360. The operation of the replace line selector will be explained with reference to FIG. 2. Symbols used for explanation are defined below:

Li: Line stored in cache memory bank i among the candidate lines to be replaced

Lr: Line to be stored

GI: Group identifier (IG or DG in the present embodiment example)

S (Li): Status of line Li

G (Lk): Group to which line Lk belongs

L (Gj) : The number of lines belonging to group Gj among the candidate lines L1, . . . , L4 to be replaced P (Gj): The number of group sets comprising or including a group Gj member among the group sets of the policy of storing Among the group sets of the policy of storing defined in the policy table 360 (FIG. 1), the number of group sets comprising or including an instruction group IG member is four; P (IG)=4 and the number of group sets including a data group DG member is two; P (DG)=2.

Operation of the Replace Line Selector 38

(1) In step 1001, the replace line selector first checks to see whether there is a line Li with its status S (Li) being "Invalid" (S(Li)=Invalid) among the candidate lines L1 , . . . , L4 to be replaced. If there is a line Li with S (Li)=Invalid, the selector selects that line as the line to be replaced in step 1002. If there are a plurality of lines Li with S (Li)=Invalid, the selector arbitrarily selects one of these lines Li (for example, according to LRU) and sets that line as the line to be replaced. The operation in the step 1002 under the condition of the step 1001 is the same as a usual cache operation under the same condition (as in the step 1001).

If, for example, all candidate lines to be replaced are put in "Invalid" status and four same-index lines belonging to a data group DG are to be stored in series into the cache memory, all entry locations corresponding to that index in the cache memory are filled with the lines belonging to the group DG. This does not match any of the above-mentioned storing patterns (pattern 1, pattern 2, and pattern 3) of the policy ① of storing defined in the policy table 360 and does not comply with the policy ① of storing, but this is acceptable. The reason for that is as follows. If the lines are stored exactly in compliance with the policy of storing defined in the policy table 360 in FIG. 1, only two lines belonging to a data group DG are stored into the cache, whereas the corresponding entries on the remaining two cache memory banks remain empty. This results in a worse efficiency than simply disregarding the policy. In the present embodiment, thus, if there is a line in "Invalid" status, a method, which is, however, in nonconformity to the policy of storing, is adopted such that the into the line should be replaced by the line to be stored cache, whatever group the line belongs to. Even if this method is adopted, the policy of storing will be followed if two or more lines belonging to an instruction group IG are later to be stored into the entry locations indexed by the same index as for the previously stored lines.

An exception to the policy may occur as noted above, i.e., a storing pattern in which the lines actually stored into the cache memory belong to a group or groups that do not match any of the storing patterns of the group sets defined in the policy of storing (this is referred to as a deviant case from the policy). In addition to the above exception, there is another exception. This exception occurs when the policy of storing is changed, though grouped lines were originally stored into the cache memory in conformity with one of the patterns of the policy of storing. For such exception, the replace line selector operates for storing the lines as will be described under items (2) and (3) below so that the pattern in which grouped lines are stored into the cache will match any of the patterns defined in the policy of storing.

(2) If the condition specified for the step 1001 is not satisfied, the procedure goes to step 1003. Here, if a relation of L (G (Lr) )≧P (G (Lr) ) is true, where L (G (Lr) is the number of candidate lines L1, . . . , L4 to be replaced that meets the condition that the line belongs to the group G (Lr) to which the line Lr to be stored belongs and P (G (Lr) ) is the number of group sets defined in the policy of storing that meets the condition that the group set comprises or includes the member of the group G (Lr) to which the line Lr to be stored belongs, the replace line selector executes step 1004. In the step 1004, among the candidate lines L1, . . . , L4 to be replaced, the selector targets the lines Li belonging to group G (Li) that is the same as the group G (Lr) to which the line Lr to be stored belongs (G (Li)=G (Lr)), and determines the line to be replaced by selecting out of the lines Li, based on the LRU information for each line Li.

The condition of L (G (Lr)=P (G (Lr)) included in the condition of L (G (Lr))≧P (G (Lr)) indicates that the number of candidate lines to be replaced that belong to the group G (Lr) is the maximum number of lines belonging to the group G (Lr) that can be stored into the cache memory in the entry locations indexed by the same index specified in the policy of storing. If L (G (Lr)≧P (G (Lr)) is true, the replace line selector determines the line to be replaced by selecting out of the candidate lines to be replaced a line that belong to the group G (Lr). The condition of L (G (Lr)>P (G (Lr)) is satisfied in the deviant case from the policy, which was described under the above item (1). Even in this case, similarly, the replace line selector determines the line to be replaced by selecting out of the candidate lines a line to be replaced that belong to the group G (Lr).

In the present embodiment example, the policy of storing ① defined in the policy table 360 gives, for example, P (IG)=4 and P (DG)=2. If the line Lr to be stored is a line belonging to an instruction group IG, and if the condition of L (IG)≧4 is satisfied where L (IG) is the number of candidate lines to be replaced that belong to an instruction group IG, the replace line selector determines the line to be replaced by selecting a line out of the candidate lines to be replaced that belong to an instruction group. Because the maximum number of L (IG) is four corresponding to the number of ways of the cache memory 35, it is impossible for an instruction group IG that L (IG) becomes less than 4 (i.e., the deviant case from the policy is impossible). If the line Lr to be stored is a line belonging to a data group DG, and if the condition of L (DG) ≧2 is satisfied where L (DG) is the number of candidate lines to be replaced a line that belong to a data group DG, the replace line selector determines the line to be replaced by selecting out of the candidate lines to be replaced that belong to a data group DG.

(3) If both conditions specified for the steps 1101 and 1003 are not satisfied, the procedure does to step 1005. Here, if the relation L (Gj)>P (Gj) is true, where L (Gj) is the number of lines Li that belong to group Gj different from the group G (Lr) to which the line Lr to be stored belongs (G (Li)=Gj) and P (Gj) is the number of group sets defined in the policy of storing that meets the condition that the group set comprises or includes the group Gj member, the replace line selector executes step 1006. In the step 1006, among the candidate lines L1, . . . , L4 to be replaced, the selector targets the lines Li belonging to group G (Li) that is the group Gj (G (Li)=Gj) and determines the line to be replaced by selecting out of the lines Li, based on the LRU information.

The condition of L (Gj))>P (Gj) is satisfied in the deviant case from the policy, which was described under the above item (1). If circumstances take place where the application of the policy of storing is not suitable (the deviant case from the policy), the replace line selector targets the lines belonging to a group Gr other than the group G (Lr) to which the line to be stored belongs and determines the line to be replaced by selecting a line out of the lines belonging to the group Gr. By this operation, the pattern in which grouped lines are stored into the cache memory approximates any of the patterns of the policy of storing.

In the present embodiment, if the line Lr to be stored is, for example, a line belonging to an instruction group IG, and if the number of candidates lines to be replaced belonging to a data group DG, namely L (DG) satisfies the condition of L (DG)>2, the replace line selector determines the line to be replaced by selecting a line out of the candidate lines belonging to a data group. If the line to be stored is a line belonging to a data group DG, because the number of candidate lines to be replaced belonging to an instruction group IG, namely L (IG) is ≦4, the condition specified for the step 1005 is not satisfied.

(4) For all the conditions specified for the steps 1001, 1003, and 1005, the procedure goes to step 1007. Here, the replace line selector targets the lines belonging to group Gk that is a member joined to a group set that also includes the group G (Lr) member to which the line Lr to be stored belongs. The replace line selector determines the line to be replaced by selecting lines out of the lines belonging to the group Gk, according to the LRU information.

In the case of the present embodiment, if the line LR to be replaced belongs to, for example, an instruction group IG, the replace line selector targets the lines belonging to a data group DG that is a member joined to a group set that also includes an instruction group IG among the group sets of the policy ① of storing (the policy ① of storing includes a group set {IG DG} that includes the member of an instruction group IG). Then, the selector determines the line to be replaced by selecting a line out of the targeted lines. If the line LR to be replaced belongs to a data group DG, the replace line selector targets the lines belonging to an instruction group ID that is a member joined to a group set that also includes a data group DG among the group sets of the policy ① of storing (the policy ① of storing includes a group set {IG DG} that includes the member of a data group DG). Then, the selector determines the line to be replaced by selecting a line out of the targeted lines.

Next, the effect of the cache memory unit 3 of Embodiment 1 will be explained. First, consider a case (normal case) where grouped lines are stored into the entry locations indexed by an index on the banks of the cache memory 35 in conformity with any of the storing patterns (pattern 1), (pattern 2), and (pattern 3) of policy ① of storing defined in the policy table 360. By way of example, consider a case where line A and line B that belong to an instruction group IG and line C and line D that belong to a data group DG are stored in the entries indexed i on the banks of the cache memory 36. Because the grouped lines are stored in the entries indexed i on the banks in the pattern (IG, IG, DG, DG), this pattern conforms to the storing pattern (pattern 3) of the policy ① of storing. When the cache is in the state described above, suppose that new lines E, F., G, and H that are assigned index i and belong to a data group are to be stored in series into the cache memory 35. Because all these lines are new and do not exist in the cache memory 35, each of them shall replace any of the previously stored lines in the entries indexed i on the banks of the cache memory.

Storing the line E will be explained first. The line to be replaced by the line E when storing the line E is determined in accordance with any of the foregoing operation procedure items 1 to 4 of the replace line selector 38. Because none of the lines stored in the entries indexed i on the banks are in "Invalid" status and the relation of L (DG) P (DG) is true for a data group DG to which the line E belongs, the replace line selector executes item (2) of the procedure items (1) to (4) described in the operation of the replace line selector. Among the lines stored in the entries indexed i on the banks of the cache memory, the selector targets the lines C and D belonging to a data group and determines the line to be replaced by selecting the most suitable one (for example, the line C), according to LRU. Then, the line E is stored into the entry where the thus determined line exists, replacing this old line. After this storing action, the lines stored in the entries indexed i on the banks of the cache memory 35 become A, B, D, and E and this pattern in which the grouped lines are stored conforms to the storing pattern (pattern 3) of the policy ① of storing. After other new lines F, G, and H are similarly stored into the cache, the lines stored in the entries indexed i on the banks of the cache memory 35 eventually become A, B, G, and H.

In the present embodiment, the processing for storing the new lines is performed in conformity with the policy of storing in this way and the lines A and B belonging to an instruction group IG are not replaced by the lines belonging to the group DG. Even after the lines E, F, G, and H are written into the cache memory, the lines A and B remain on the cache memory. When the cache is accessed for reference to the line A or B after the line H is stored, the line search will be a hit.

Meanwhile, for comparison purposes, for the same example as described above, suppose that the example lines are stored into a typical known cache which is based on the method of storing all lines equally. In this case, the line to be replaced is determined without discrimination between the lines belonging to an instruction group IG and the lines belonging to a data group DG. Thus, the lines A and B will be replaced by any of the lines E, F, G, and H and eventually, the lines stored in the entries indexed i on the banks of the cache memory 35 become E, F, G. and H. In this case, when the cache is accessed for reference to the line A or B after the line H is stored, the line search will be a miss.

As evident from the above example, if the probability of reusing the lines belonging to an instruction group is higher and the probability of reusing the lines belonging to a data group lower, and if the latter lines are more frequently accessed than the former lines, in a typical known cache, a line belonging to an instruction group is replaced by a line belonging to a data group, though the former line is more likely to be reused than the latter line, resulting in a low hit rate of the cache memory. In contrast, in the present embodiment of the invention, a line belonging to an instruction group is more preferentially stored into the cache than a line belonging to a data group as in the policy ①. Thus, a line that belongs to an instruction group and is more likely to be reused is less replaced by a line that belongs to a data group and is less likely to be reused. Consequently, the present invention produces the following effect: the cache hit rate increases; and the invention can achieve higher performance of the information processing device using a cache configured by the invention than a corresponding device equipped with a typical known cache.

The cache configured by the invention is adaptive to dynamic change to the policy of storing, which will be explained below. Before a change to the policy occurs, suppose that the lines A and B belonging to an instruction group IG and the lines C and D belonging to a data group DG are stored in the entries indexed i on the banks of the cache memory 35, according to the policy (I) of storing defined in the policy table 360 in FIG. 1. The grouped lines are stored in the entries indexed i on the banks of the cache memory 35 in the pattern (IG, IG, DG, DG) which conforms to the storing pattern (pattern 3) of the policy ① of storing. When the cache is in this state, assume that policy ② of storing as a new policy has now been registered into the policy table by the policy definition controller 71. The policy ② of storing is as follows:

({IG}, {IG}, {IG}, {IG DG})      ②

The change to the policy ① to the policy ② of storing means that priority of storing is given to a line belonging to a data group. The pattern in which the lines A, B, C, and D are stored does not conform to the policy ① of storing. Under this state, assume that a new line E belonging to an instruction group E is to be stored. None ol the lines indexed by i are in "Invalid" status in the cache memory 35. Because of L (IG)=2 for an instruction group IG, the relation of L (IG)≧P (IG) is true. At the same time, because of L (DG)=2 for an instruction group IG, the relation of L (DG)≧P (DG) is true. Thus, the replace line selector 38 executes item (3) of the procedure items (1) to (4) described in the operation of the replace line selector. The selector targets the lines C and D belonging to a data group and determines the line to be replaced by selecting the most suitable one (for example, the line C), according to LRU. Then, the lines A, B, D, and E are stored in the entries indexed i on the banks of the cache memory. These lines are stored in the pattern (IG, IG, IG, DG) which conforms to the pattern of the policy 2. Thus, the cache is adaptable to dynamic change to the policy of storing, which is one of the advantages of the cache memory of the present invention.

The cache memory unit 3 of Embodiment 1 is installed in the memory controller 2 and refers to the tag 54, index 55, and instruction/data discrimination bit 56 information in a command issued from a processor. Because all of such information is included in a command that is normally issued from typical known processors, the cache memory unit 3 can be embodied simply by changing the memory controller without changing the processors 1. Thus, this solves problem 3, which is one of the advantages of the cache memory of the present invention.

Embodiment 2

Figures 3, 4, 5:
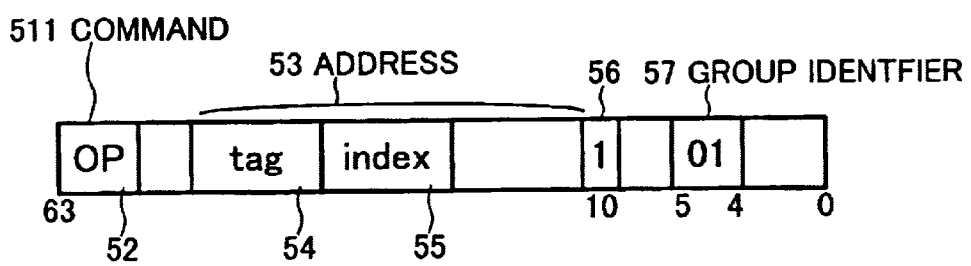
FIG. 3 is a group definition table containing an example of values of group definitions that are assigned in a preferred Embodiment 2 of the present invention.
FIG. 4 is a policy table containing an example of values that are used with the group definition table of FIG. 3 in Embodiment 2.
FIG. 5 is a diagram which shows the structure of a command to be used in a preferred Embodiment 3 of the present invention.

A cache as a preferred Embodiment 2 of the invention is configured the same as shown in FIG. 1 of Embodiment 1. The change is to the values to be assigned to the tables. The values given in the group definition table 350 in FIG. 1 are changed to those in a group definition table 3501 which is shown in FIG. 3. The values given in the policy table 360 in FIG. 1 are changed to those in a policy table 3601 which is shown in FIG. 4. With the exception of these two tables and the group selector 37 and the replace line selector 38, shown in FIG. 1, that operate depending on the values of the tables, other components are configured and operate as in Embodiment 1.

In the group definition table 3501 in FIG. 3, the definitions of two groups are registered on its first line 356 and second line 357. The table may contain definitions of three or more groups. The group definition on the first line 356 means that the identifier of a group to which a line to be accessed by a command belongs is G1 if the string of the 24th to 39th bits of the command 51, shown in FIG. 1, falls within the range from 0x0000 to 0x1200. The group definition on the second line 357 means that the identifier of a group to which a line to be accessed by a command belongs is G2 if the string of the 24th to 39th bits of the command 51, shown in FIG. 1, falls within the range from 0x0x1201 to 0xBE00. Because the 24th to 39th bits of the command 51 are part of the address 53 part, lines are grouped by the address of the line to be accessed.

According to the group definition table 3501 in FIG. 3, the group selector 37 shown in FIG. 1 distinguishes a group to which the line to be accessed by the command 51 belong as follows. When the string of the 24th to 39th bits of the command 51 falls within the range from 0x0000 to 0x1200, the group selector finds G1 as the identifier of the group to which the line to be accessed by the command belongs. When the string of the 24th to 39th bits of the command 51 falls within the range from 0×0×1201 to 0×BE00, the group selector finds G2 as the identifier of the group to which the line to be accessed by the command belongs.

In the policy table 3601 in FIG. 4, the group identifiers G1 and G2 defined in the group definition table 3501 are used; the former G1 replacing the instruction group IG in the policy table 360 in FIG. 1 and the latter G2 replacing the data group DG in the policy table 360 in FIG. 1. With the exception of the group identifiers, the policy table 3601 in FIG. 4 serves all the same as the policy table 360 in FIG. 1 does. Because the policy table 3601 in FIG. 4 is all the same as the policy table 360 in FIG. 1 except for the group identifiers, the replace line selector 38, shown in FIG. 1, that selects a line to be replaced while referring to the policy table 3601 also operates in all the same way as described in the operation of the replace line selector in Embodiment 1, except that different group identifiers are used.

As implied above, Embodiment 2 substantially differs from Embodiment 1 in the group definitions and the method of distinguishing groups. Thus, Embodiment 2 produces much the same effect as Embodiment 1, but there is some difference of effect due to the different manner of group definition. In Embodiment 1, the lines belonging to an instruction group are stored into the cache memory 35 more preferentially than the lines belonging to a data group, but the lines in an instruction group or a data group are treated equally. As for the lines in one group, the same problem is posed as for a typical known cache that equally treats the lines. In contrast, in Embodiment 2, the lines are grouped by the line address; thereby, for example, even the lines belonging to a data group can be classified into subgroups. Embodiment 2 makes it possible or a line classified as a subgroup to be more preferentially stored into the cache memory 35 than a line classified as another subgroup, which can increase the cache hit rate, according to circumstances. This is an advantage of Embodiment 2. In some cases, the application of Embodiment 1 can achieve a higher performance of the cache; in other cases, the application of Embodiment 2 can achieve a higher performance of the cache. This mainly depends on the nature of the program to be executed. Furthermore, grouping the lines into instruction and data groups as in Embodiment 1 and grouping the lines by the line address as in Embodiment 2 may be mixed and specified in the group definition table 350. In this manner, more flexible cache operation can be expected than in Embodiment 1 or Embodiment 2 and the cache is likely to achieve higher performance.

Embodiment 3

Figures 6, 7:
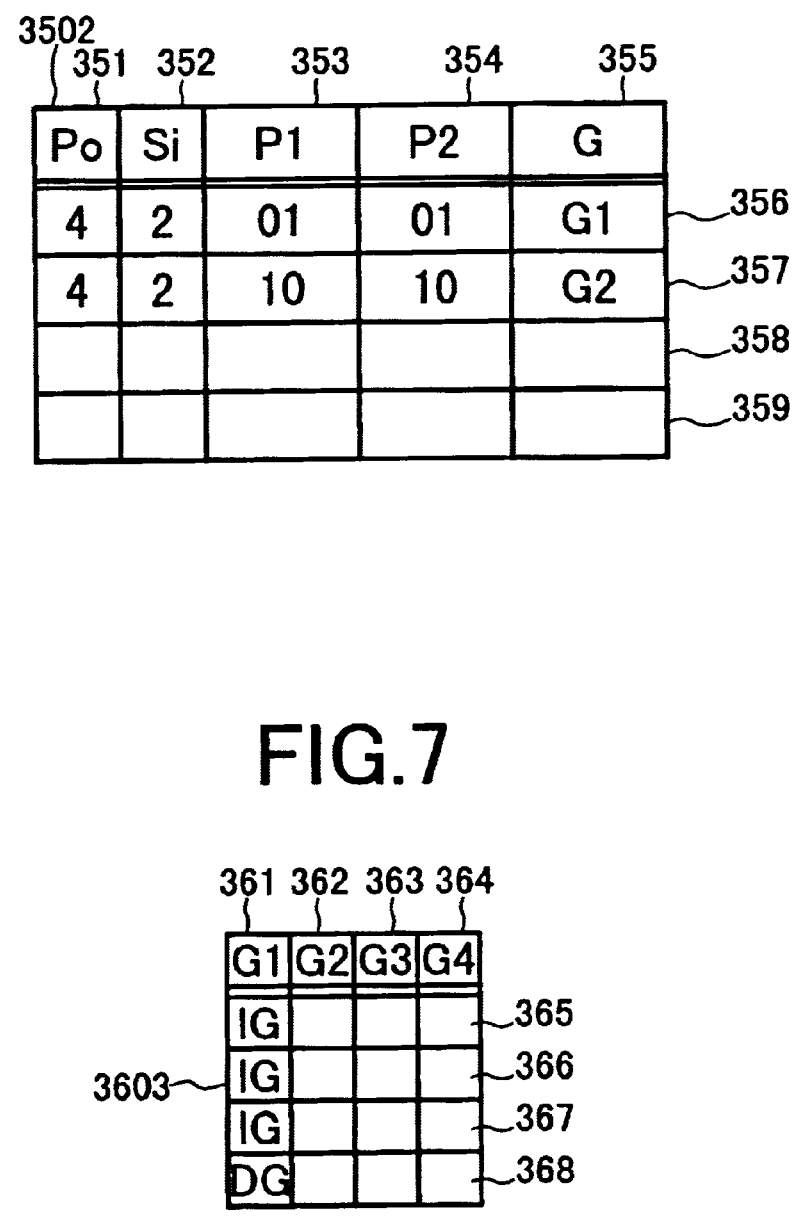

A cache as a preferred Embodiment 3 of the invention is configured in the same manner as shown in FIG. 1 of Embodiment 1. The change to Embodiment 1 is as follows. A command 511 which is shown in FIG. 5 is used instead of the command 51 shown in FIG. 1. The values given in the group definition table 350 in FIG. 1 are changed to those in a group definition table 3502 which is shown in FIG. 6. The values given in the policy table 360 in FIG. 1 are changed to those in the policy table 3601 which is shown in FIG. 4. The policy table 3601 in FIG. 4 is used as explained in connection with Embodiment 2. Because the given policy table and the group identifiers G1 and G2 for distinguishing the groups are the same as in Embodiment 2, the replace line selector 38 operates in the same way as in Embodiment 2. With the exception of the command 511, the group definition table 3502, and the group selector 37 that operates depending on this table, other components of the cache memory unit 3 are the same as in Embodiment 1 or Embodiment 2.

The command 511 shown in FIG. 5 is a modification of the command 57 to which the group identifier 57 is added in the 4th and 5th bits. It is obvious that a group to which a line to be accessed by the command 511 belongs is the group identified by the group identifier 57 in the command. The group identifier is intended to allow the user to specify a group to which data belongs in a program or a compiler to specify a group to which data belongs.

In the group definition table 3502 shown in FIG. 6, definitions of two groups are registered on its first line 356 and second line 357. The table may contain definitions of three or more groups. The group definition on the first line 356 means that the identifier of a group to which a line to be accessed by a command belongs is G1 if the two 4th and 5th bits of the command 511, shown in FIG. 5, contain "01." The group def inition on the second line 357 means that the identifier of a group to which a line to be accessed by a command belongs is G2 if the two 4th and 5th bits of the command 511, shown in FIG. 5, contain "10."

According to the group definition table 35021 in FIG. 6, the group selector 37 shown in FIG. 1 distinguishes a group to which the line to be accessed by the command 511 belong as follows. If the two 4th and 5th bits of the command 511 contain "11," the group selector finds G1 as the identifier of the group to which the line to be accessed by the command belongs. If the two 4th and 5th bits of the command 511 contain "10," the group selector finds G2 as the identifier of the group to which the line to be accessed by the command belongs.

As implied above, Embodiment 3 substantially differs from Embodiment 1 and Embodiment 2 only in group definitions and the method of distinguishing groups. Thus, Embodiment 3 produces much the same effect as Embodiment 1, but there is some difference of effect due to the different manner of group definition. In Embodiment 1, lines are grouped into two groups: an instruction group and a data group. This grouping is rather rough and maybe ineffective in some cases. In Embodiment 2, because lines are grouped by the line address. fine grouping can be set if the address range of one group is set small and many groups are defined. However, this method has the inherent problem that the size of the group definition table becomes larger and it takes a longer time to distinguish a group on the other hand, the method of Embodiment 3 allows the user or compiler to specify a line to be stored preferentially into the cache or a line not to be so for any part of a program and the fineness of grouping can be set almost arbitrarily. Due to this, a higher performance of the cache can be achieved in Embodiment 3 in some case, though the cache performance is not enhanced significantly in Embodiments 1 and 2. This is an advantage of Embodiment 3.

Embodiment 4

A cache as a preferred Embodiment 4 of the invention is configured the same as shown in FIG. 1 of Embodiment 1. The only change to Embodiment 1 is as follows. The values given in the policy table 360 in FIG. 1 are changed to those in a policy table 3603, which is shown in FIG. 7. With the exception of the policy table 3603 and the replace line selector 38 that operates depending on this table, other components of the cache memory unit 3 are all the same as in Embodiment 1.

The policy table 3603 shown in FIG. 7 defines the following policy of storing, comprising group sets, each of which comprises one group member:

$$(\{IG\}, \{IG\}, \{IG\}, \{DG\}) \qquad (3)$$

This means that, among the lines to be stored into the entries indexed i on the banks of the cache memory 35 in FIG. 1, three lines belong to an instruction group IG and the remaining one line belongs to a data group DG. That is, this policy ③ of storing means that the cache memory 35 is logically divided into an area allocated for lines belonging to an instruction group and an area allocated for lines belonging to a data group. Although this policy ③ of storing only specifies the number of lines belonging to an instruction group and the number of a line belonging to a data group among the lines that can be stored into the same-index entries, the mapping between the lines and the cache memory banks to store them of the cache memory 35 may be specified. In the latter case, counting the number of lines belonging to a group to be stored into the same-index entries on the banks of the cache memory can be omitted, whereby processing is simplified.

The replace line selector 38, shown in FIG. 1, operates for processing in Embodiment 4 in the same way as explained in connection with Embodiment 1.

Because the replace line selector 38 basically operates according to the same algorithm as for Embodiment 1, its effect is much the same as produced in Embodiment 1, but there is some difference. As lines are stored in conformity with the policy ① of storing in Embodiment 1, there is a possibility of replacing a line belonging to an instruction group by a line belonging to a data group. For example, if four lines A, B, C, and D which are stored in the entries indexed i on the banks of the cache memory 35 all belong to an instruction group IG and a new line E belonging to a data group DG is later stored into one of these entries of the cache, any one of the lines A to D will be replaced by the line E. Therefore, how lines belonging to an instruction group are stored into the cache as well as how lines belonging to a data group are stored into the cache affect the cache hit rates of the former lines and the latter lines. Specifically, if lines belonging to a data group are frequently stored into the cache and the probability of reusing them is relatively low, the cache hit rate of lines belonging to an instruction group also decreases. This problem is the same one that inevitably arises in a typical known cache into which all lines are equally stored. On the other hand, in Embodiment 4, with the exception of the deviant case from the policy, which was explained in connection with Embodiment 1, a line belonging to an instruction group IG is not replaced by a line belonging to a data group DG and vise versa. Therefore, in Embodiment 4, the cache hit rate of lines belonging to an instruction group IG entirely depends on how these lines are stored into the cache. Similarly, the cache hit rate of lines belonging to a data group DG entirely depends on how these lines are stored into the cache. The lines of one group and the lines of another group do not mutually af f ect the cache hit rate of the other group lines. Consequently, the above-mentioned problem of Embodiment 1 does not arise and a stable cache hit rate can be expected. This is an advantage of Embodiment 4.

Embodiment 5

Figure 8:
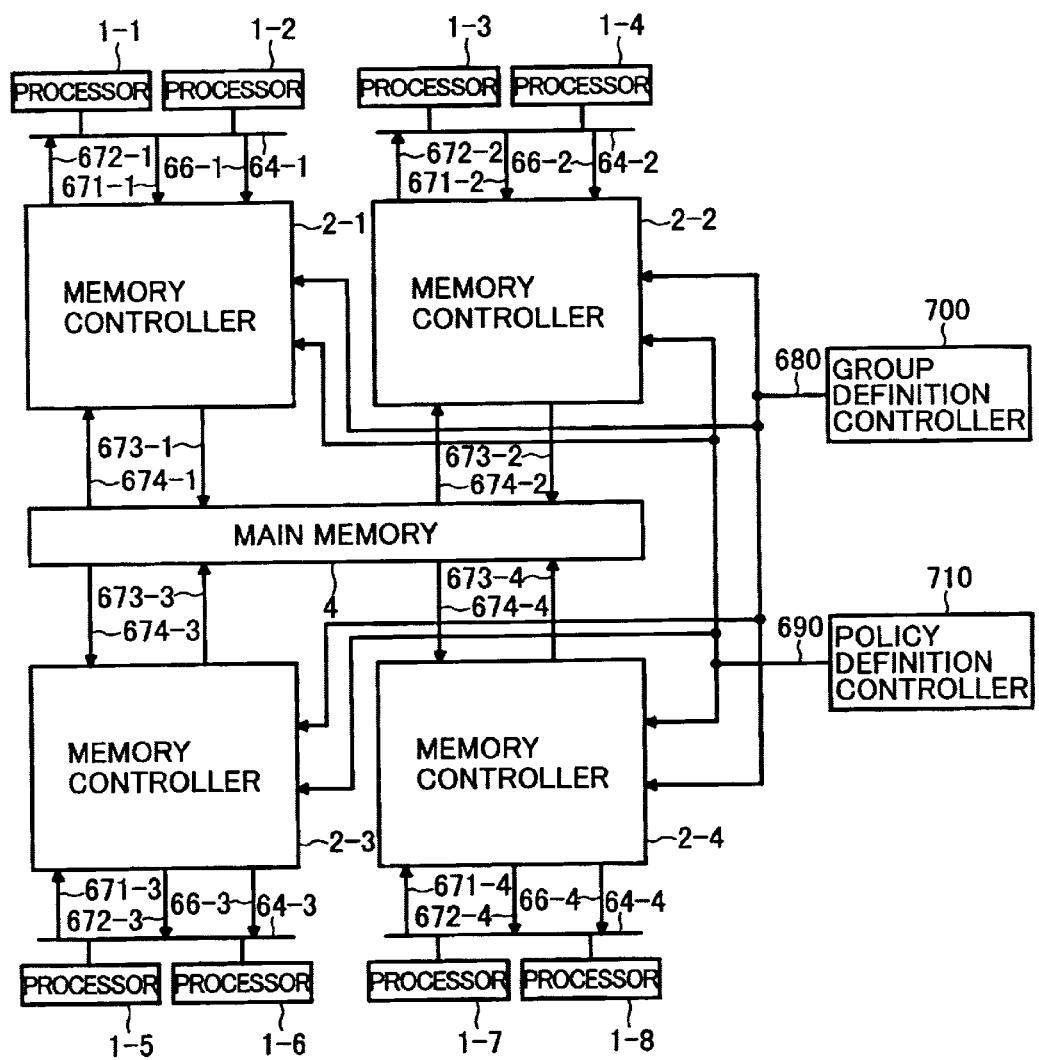
FIG. 8 is a block diagram showing a preferred Embodiment 5 of the present invention.

A preferred Embodiment 5 of the invention is represented by a modification of Embodiment 1. FIG. 8 shows the configuration of Embodiment 5. Eight processors 1-1 to 1-8 shown in FIG. 8 are the same as the processor 1-1 shown in FIG. 1. Four memory controllers 2-1 to 2-4 shown in FIG. 8 are the same as the memory controller 2 shown in FIG. 1. A main memory 4 shown in FIG. 8 has the same capability as the main memory 4 shown in FIG. 1, but with a plurality of ports, which is a difference from the main memory in FIG. 1. Processor buses 64-1 to 64-4 shown in FIG. 8 are the same as the processor bus 64 shown in FIG. 1. Address paths 66-1 to 66-4 shown in FIG. 8 are the same as the address path 66 shown in FIG. 1. Data paths 671-1 to 671-4 shown in FIG. 8 are the same as the data path 671 shown in FIG. 1. Data paths 672-1 to 672-4 shown in FIG. 8 are the same as the data path 672 shown in FIG. 1. A group definition controller 700 shown in FIG. 8 functions much the same as the group definition controller 70 shown in FIG. 1. However, the group definition controller 700 is used to register group definition into the group definition table 350, shown in FIG. 1, in the specified memory controller among the memory controllers 2-1 to 2-4 in FIG. 8, which is a difference from the group definition controller 70 in FIG. 1. A policy definition controller 710 shown in FIG. 8 functions much the same as the policy definition controller 71 shown in FIG. 1. However, the policy definition controller 710 is used to register policy into the policy table 360, shown in FIG. 1, in the specified memory controller among the memory controllers 2-1 to 2-4 in FIG. 8, which is a different point from the policy definition controller 71 in FIG. 1. A path 680 shown in FIG. 8 forms the connection between the group definition controller 700 in FIG. 8 and the memory controllers 2-1 to 2-4 in FIG. 8. A path 690 shown in FIG. 8 forms the connection between the policy definition controller 710 in FIG. 8 and the memory controllers 2-1 to 2-4 in FIG. 8.

Two processors connected by a processor bus and a memory controller that is connected to the processor bus will be referred to as a node hereinafter. Nodes, having memory controllers 2-1, 2-2, 2-3, and 2-4, respectively, are referred as node 1, node, 2, node 3, and node 4. Embodiment 5 is configured such that the four nodes share one main memory. This information processing device can be divided into a plurality of partitions, each of which comprises one or more nodes and can operate as an independent information processing unit. A partition definition table 800, which is shown in FIG. 9, defines the relation between the nodes and the partitions; what node belongs to what partition. This table contains a set of values assigned by the user by using a means that can be embodied by a publicly known technique, for example, such as a console. one partition is defined on each of the lines 805 to 808 of the partition definition table 800. A maximum of four partitions can be defined. Columns 801 to 804 of the table correspond to nodes 1 to 4. If a value of 1 is set in the column of a node on a partition line, it indicates that the node belongs to the partition. As for the partition definition table illustrated in FIG. 9, the set values indicate that partition P1 comprises nodes I and 2, partition P2 comprises node 3, and partition P3 comprises node 4. Although the information processing device is divided into three partitions in the present example of Embodiment 5, the device, of course, may be used as a whole unit without being partitioned.

The operation of Embodiment 5 will be explained below. The operation of Embodiment 5 is much the same as the operation of Embodiment 1, but differs in the procedure of ".initialization" of the tables and modifying the group definitions and the policy of storing in the tables.

Initialization for Embodiment 5 is performed as follows.

Group definitions to be set for a partition P1 are registered through the group definition controller 700 in FIG. 8 into the group definition tables 350 in the memory controllers of all nodes that belong to the partition P1. By referring to the partition definition table 800 shown in FIG. 90, it is understood that nodes 1 and 2 belong to the partition Pi. Thus, the group definitions are registered into the group definition tables in the memory controllers 2-1 and 2-2 of the nodes 1 and 2. Then, group definitions to be set for a partition 2 are registered into the group definition tables 350 in the memory controllers of all no es that belong to the partition P2. Finally, group definitions to be set for a partition P3 are registered into the group definition tables 350 in the memory controllers of all nodes that belong to the partition P3.

Similarly, a policy of storing to be set for the partition P1 is registered through the policy definition controller 710 in FIG. 8 into the policy tables 360 in the memory controllers of all nodes that belong to the partition Pi. Policy of storing to be set for the partition P2 is registered into the policy tables 360 in the memory controllers of all nodes that belong to the partition P2. Grouping patterns (policy of storing) to be set for the partition P3 are registered into the policy tables 360 in the memory controllers of all nodes that belong to the partition P3. After the above initialization is completed, the nodes operate all the same as in Embodiment 1.

When the group definitions and the policy of storing for a partition are modified, through the group definition controller '700 and the policy definition controller 710, new group definitions and policy of storing are registered into the group definition tables 350 and the policy tables 360 in the memory controllers of the nodes that belong to the partition in the same way as for the above initialization. Then, the nodes within the partition operate all the same as in Embodiment 1.

The effect of Embodiment 5 is that different group definitions and policy of storing can be specified for each partition, as obvious from the above description of the initialization operation.

As regards installing the cache on an LSI in the configurations of the above Embodiments, the cache memory unit may be installed within the processor LSI; alternatively, it may be installed within the memory controller LSI that is placed between the processors and the main memory and controls the access of the processors to the main memory. In the latter case, however, the embodiments are feasible only by modifying the information processing system and can provide a cache memory unit of higher performance than a typical known cache that treats the lines equally.

The present invention has been described in terms of preferred embodiments. However, those skilled in the art will recognize that many variations of such embodiments exist. Such variations are intended to be within the scope of the present invention and the appended claims.

What is claimed is:

1. A cache memory unit comprising:

a cache memory, placed between processors and a main memory, to temporarily store data in units of lines of given size retrieved from the main memory and store control information associated with data of the lines it retains;

a group definition controller that is used to define grouping of lines to be put under management;

a group selector to determine one of a plurality of groups defined by means of said group definition controller as the group to which a line to be fetched belongs, according to the information in a command that has been issued from one of the processors to fetch data from said main memory;

a policy definition controller that is used to set policy of storing whereby to store lines into the same-index entries on the banks of the cache memory in one of the patterns of combinations of a plurality of groups, to any of which the lines belong, according to said grouping;

a hit checker to judge whether a line specified to be read in the command from one of the processors remains stored on the cache memory;

a replace line selector to determine a line to be replaced and removed from the cache memory in accordance with the group to which a new line belongs, determined by said group selector, the line control information retained in said cache memory for the candidate lines to be replaced, and the policy of storing set by means of said policy definition controller if the judgment of said hit checker is a missed hit; and a storing means to retrieve said line specified to be read from the main memory and store the line with control information for the line in place of the line determined to be replaced by said replace line selector into the cache memory if the judgment of said hit checker is a missed hit.

2. The cache memory unit according to claim 1, wherein:

said control information associated with each line that said cache memory retains includes the status of the line, the attribute of the line, and the LRU information that indicates the last time the line was accessed.

3. The cache memory unit according to claim 1, wherein group definitions to be set by means of said group definition controller are such that a line accessed as a result of that one of the processors issues an instruction access command to access an instruction is the line belonging to an instruction group as its attribute and a line accessed as a result of that one of the processors issues a data access command to access data is the line belonging to a data group as its attribute; and said group selector determines the group to which a line belongs, depending on whether the line is accessed as a result of that said processor issues an instruction access command or a data access command, based on the group definitions.

4. The cache memory unit according to claim 1, wherein:

group definitions to be set by means of said group definition controller are such that address space of the main memory is divided into m ($\geq 1$) pieces of non-overlapping address space sections and an address space section allocated for a line is defined as the attribute of the line; and said group selector determines the attribute of a line, according to the address space section within which the address of the object line falls, specified in the command issued from one of the processors.

5. The cache memory unit according to claim 1, wherein:

group identifiers representing m ($\geq 1$) pieces of group attributes are predetermined:

one of the group identifiers is embedded into a command issued from one of the processors;

group definitions to be set by means of said group definition controller are such that the attribute of a group to which data accessed by the command belongs is identified by the group identifier embedded in the command; and said group selector distinguishes the group attribute of a line accessed by a command issued from one of the processors by referring to one of the group identifiers embedded in the command.

6. The cache memory unit according to claim 1, wherein:

group identifiers representing m ($\geq 1$) pieces of group attributes are predetermined; and said policy definition controller is used to assign sets Pk={Gi, . . . , G1} (hereinafter referred to as group sets) as many (P1, . . . , Pn) as the number of memory banks n of the cache memory, each group set consisting of one or more members out of group identifiers G1, ..., Gm, as the policy of storing.

7. The cache memory unit according to claim 6, wherein group sets P of the policy of storing, which are assigned by means of said policy definition controller, are the sets (P={G}), to each of which a single group member is assigned.

8. The cache memory unit according to claim 7, wherein said policy definition controller is used to assign group sets as many as the number of memory banks n of the cache memory and moreover the one-to-one mapping between the group sets and the memory banks of the cache memory as the policy of storing.

9. The cache memory unit according to claim 2, wherein:

said replace line selector refers to the object subpart of the address part of a command issued from one of the processors, determines a set of the same-index entries on the banks of the cache memory (hereinafter referred to as a set of the same-index entries), into one of which the line to be accessed by the command is to be stored, and determines a line to be replaced by selecting out of the previously stored lines in the set of the same-index entries, according to the status, LRU, and attribute information for the lines stored in the set (hereinafter referred to as lines stored in the set of the same-index entries), the attribute (hereinafter referred to as group Gr to which the line to be stored belongs) of the line to be stored (hereinafter referred to as line Lr to be stored), and the policy of storing.

10. The cache memory unit according to claim 9, wherein:

said replace line selector determines a line to be replaced as follows:

among the lines L1, ..., Ln stored in the set of the same-index entries, if lines Li, ..., Lj put in invalid status (hereinafter referred to as Invalid) exist (this condition is hereinafter referred to as Condition 1), the replace line selector selects a line to be replaced out of the lines Li, ..., Lj (this action is hereinafter referred to as Action 1);

among the lines L1, ..., Ln stored in the set of the same-index entries, if the number of the lines L (Gr) belonging to the group Gr to which the line to be stored belongs is equal to or greater than the number of group sets P (Gr) comprising or including the group Gr member, defined in the policy of storing (L (Gr)≧P (Gr)) (this condition is hereinafter referred to as Condition 2), the replace line selector selects a line to be replaced out of the lines Lk, ..., Ll belonging to the group Gr to which the line to be stored belongs among those stored in the set of the same-index entries, according to the LRU information (this action is hereinafter referred to as Action 2);

among the groups (G1, ..., Gr−1, Gr+1, ..., Gm) other than the group Gr to which the line to be stored belongs, if groups Gp, ..., Gq exist that meet the condition that the number of the lines stored in the set of the same-index entries and belonging to a particular group is greater than the number of the members identified as this particular group included in said group sets (P (G1), ..., P (Gr−1), P (Gr+1), ..., P (Gm)) (L (Gp)>P (Gp), ..., L (Gq)>P (Gq)) (this condition is hereinafter referred to as Condition 3), the replace line selector selects a line to be replaced out of the lines Ls, ..., Lt belonging to any of the groups Gp, ..., Gq, according to the LRU information (this action is hereinafter referred to as Action 3); and if none of Condition 1, Condition 2, and Condition 3 are satisfied, the replace line selector targets lines Lv, ..., Lw that belong to group Gu, a member joined one of said group sets that also includes the group Gr member to which the line to be stored belongs among the lines stored in the set of the same-index entries, and selects a line to be replaced out of the lines Lv, ... Lw, according to the LRU information.

11. The cache memory unit according to claim 10, wherein:

said replace line selector executes Action 1 if the following condition, instead of Condition 1, is satisfied:

among the lines L1, ..., Ln stored in the set of the same-index entries, lines Li, ..., Lj put in Invalid status exist; and among the lines Li, ..., Ln stored in the set of the same-index entries, the number of the lines L (Gr) belonging to the group Gr to which the line to be stored belongs is less than the number of group sets P (Gr) comprising or including the group Gr member (L Gr)<P (Gr)).

12. The cache memory unit according to claim 11, wherein:

as the policy of storing assigned by means of said policy definition controller, as many grouping attributes as the number of banks n of the cache memory are predetermined with each attribute being mapped to one of the cache memory banks; and said replace line selector executes Action 1 if the following condition, instead of Condition 1, is satisfied:

among the lines L1, ..., Ln stored in the set of the same-index entries, lines Li, ..., Lj put in Invalid status exist; and group sets comprising or including the group Gr member to which the line to be stored belongs are mapped to the memory banks M (Li), ..., M (Lj) where the line Li, ..., Lj are stored respectively;

if Condition 2 is satisfied, the replace line selector executes the following action, instead of Action 2:

the replace line selector selects a line to be replaced out of lines Lo, ..., Lp stored in the entries on the memory banks to which the group sets Pk, ..., Pl comprising or including the group Gr member to which the line to be stored belongs are mapped, according to the LRU information for the lines; and if Condition 3 is satisfied, the replace line selector executes the following action, instead of Action 3:

the replace line selector selects a line to be replaced out of lines Ls, ..., Lt belonging to any of the groups Gp, Gq and stored in the entries on the memory banks M (Ls), M (Lt) to which the group sets comprising or including the Gr group member to which the line to be stored belongs are mapped, according to the LRU information.

13. A cache memory unit comprising:

a partition definition means that is used to specify what processor belongs to what partition for a plurality of processors grouped into a plurality of partitions;

a group definition controller that is used to define grouping of lines to be put under management for each partition defined by the partition definition means;

a policy definition controller that is used to set policy of storing whereby to store lines into the same-index entries on the banks of the cache memory in one of the patterns of combinations of groups, to any of which the lines belong, according to the grouping defined for the partition, for each partition defined by the partition definition means; and a plurality of memory controllers placed between said processors and a main memory and connected to the processors and the main memory, each memory controller comprising:
1) a plurality of cache memories to temporarily store data in units of lines of given size retrieved from the main memory in data block units in the main memory and store control information associated with each line it retains;
2) a group selector to determine one of the groups defined by means of said group definition controller as the group to which a line to be fetched belongs, according to the information in a command that has been issued from one of the processors connected to said memory controller to fetch a data block from said main memory;
3) a hit checker to judge whether a line specified to be read in the command from one of the processors remains stored on the cache memory;
4) a replace line selector to determine a line to be replaced and removed from the cache memory in accordance with the group to which a new line belongs, determined by said group selector, the line control information retained in said cache memory for the candidate lines to be replaced, and the policy of storing set by means of said policy definition controller if the judgment of said hit checker is a missed hit;
5) a storing means to retrieve said line specified to be read from the main memory and store the line with control information for the line in place of the line determined to be replaced by said replace line selector into the cache memory if the judgment of said hit checker is a missed hit.

* * * * *